United States Patent

[11] 3,603,203

| | | |
|---|---|---|
| [72] | Inventor | Richard P. Rhodes<br>Vernon, Conn. |
| [21] | Appl. No. | 2,130 |
| [22] | Filed | Jan. 12, 1970 |
| [45] | Patented | Sept. 7, 1971 |
| [73] | Assignee | Pratt & Whitney Inc.<br>West Hartford, Conn. |

[54] PNEUMATIC TOOL-SENSING SYSTEM FOR MACHINE TOOL
14 Claims, 2 Drawing Figs.

[52] U.S. Cl. .................................................. 90/11 A,
77/1
[51] Int. Cl. .................................................. B23q 17/18
[50] Field of Search........................................... 90/11 A;
77/1; 279/89; 29/568

[56] References Cited
UNITED STATES PATENTS

| 3,513,734 | 5/1970 | Burroughs et al............ | 29/568 X |
| 3,520,228 | 7/1970 | Wohlfeil...................... | 29/568 X |

Primary Examiner—William S. Lawson
Assistant Examiner—Z. R. Bilinsky
Attorney—Harry R. Dumont ABSTRACT: A toolholder has a predetermined radially aligned position in a head spindle for orienting a tool of the single-point type. An airflow path is provided between a bore in the spindle and a groove in the toolholder and thence to an exit port in the spindle. A pressure-sensitive sensing system provides a signal output which indicates whether or not the toolholder is properly loaded and radially aligned in the spindle.

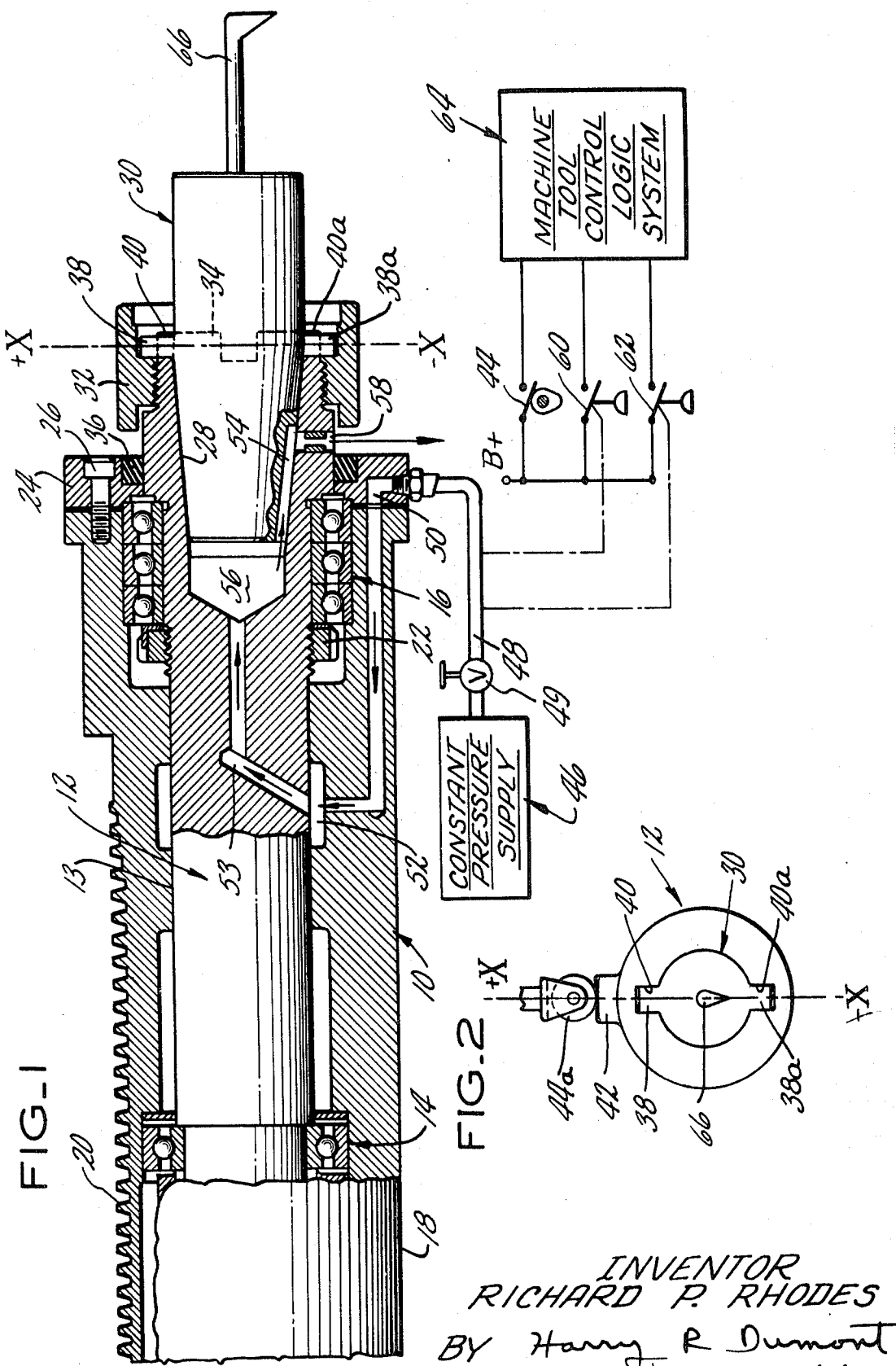

PNEUMATIC TOOL-SENSING SYSTEM FOR MACHINE TOOL

BACKGROUND OF THE INVENTION

Various systems are known for locating, accepting, and stopping toolholders in predetermined angular positions. The most common prior art systems involve the use of keys adapted to be received in keyways in the holder such as shown in Zankl et al. U.S. Pat. No. 3,422,724 issued on Jan. 21, 1969 for "Mechanism for Effecting Angular Orientation of a Machine Tool Spindle." Another system for sensing the presence or absence of a tool in a socket in a change-ready position by means of actuation of a switch is shown in Lohneis U.S. Pat. On. 3,355,797 issued on Dec. 5, 1967 for "Machine Tool with a Tool Changer."

The pneumatic tool-sensing system of my invention is particularly adaptable to use in a machine tool with automatic tool change features in which the tool and its holder must be properly oriented with respect to the workpiece or to a defined machine tool axis. My system will further reliably indicate when a toolholder has been properly and completely installed in or removed from the machine tool spindle. It should be noted that the system is described below in the setup where the workpiece is stationary and the tool is rotating relative to the workpiece. My invention is equally applicable to a system modified in a manner apparent to one skilled in the machine tool art in which the tool is a stationary, i.e. a nonrotating one and the workpiece is interchanged with the tool and supported by the spindle for rotation therewith.

SUMMARY OF THE INVENTION

My toolholder sensing system involves only minor modification of a standard toolholder and spindle and thus involves little additional mechanism. My invention is particularly useful in the case of an asymmetric cutting tool such as a boring bar. Measurement taken of the distinct air pressure level differences in the line provide indication of whether the tool is correctly positioned, incorrectly positioned, or not completely seated in the spindle. The signal outputs obtained from pressuresensitive switches are conveniently adaptable for use in any machine tool logic system controlling the tool change cycle.

BRIEF DESCRIPTION OF THE DRAWING

FIG. 1 of the drawing shows a machine tool spindle in partial half section with parts broken away to better illustrate the construction involved. Also included is a combined diagrammatic and schematic system for providing a signal output; and FIG. 2 is a diagrammatic end view of the spindle showing the axis sensing system.

DESCRIPTION OF THE PREFERRED EMBODIMENT

My invention is shown in FIG. 1 incorporated in a head for a machine tool which includes the stationary quill 10. Spindle 12 is mounted for rotation in a central bore 13 in quill 10 on a rearward ball bearing member 14 and a forward three-raceway ball bearing member 16. Quill 10 includes outer portion 18 and a rack 20 at its left end. Forward bearing member 16 is held in place between a locknut 22 at one end and at the other end by a retaining plate 24. Plate 24 is fastened to the right end of quill 10 by a plurality of bolts, one of which is indicated at the top by the numeral 26. Spindle 12 further has a tapered bore portion 28 adapted to receive the tapered shank of toolholder 30. A locking collar 32 is threadably engageable with the right-hand end of spindle 12 proximate its jaws 34. A ring seal 36 is mounted about spindle 12 as shown. Tool holder 30 further has two lobes 38, 38a spaced 180° apart which lobes fit into similarly disposed slots 40, 40a formed in jaws 34 at the end of spindle 12. A cam 42 is mounted on spindle 12 and axially aligned with the upper slot 40 in spindle 12. Spindle 12 is rotated until he cam 42 actuates the limit switch 44 which switch is mounted at a fixed position on the machine tool frame. Cam 42 is used to determine the axis sense (plus or minus) of that spindle slot with respect to a defined machine tool axis such as along the line "X" as will be explained in the section "Description of Operation" hereinafter.

To provide the pneumatic sensing function, a constant pressure source 46 is connected through a needle valve 49 and a conduit 48 to a passageway 50 in quill 10. An air transfer bearing connection 52 is provided between the upper end of passageway 50 and the inlet to a second passageway 53 formed in spindle 12. An axial groove portion 54 on the periphery of toolholder 30 is aligned with one of the lobes 38a thereon. It is the function of groove portion 54 to transfer the airflow from chamber 56 in the spindle through a radial aperture 58 in spindle 12 to atmosphere. This transfer of airflow and resultant pressure change in the system indicates whether or not groove portion 54 in toolholder 30 is properly aligned with aperture 58.

A sensing network is connected to the pneumatic sensing system, particularly conduit 48, to provide electrical output signals indicative of the pressure changes occurring in the system. This network includes pressure-actuated switches 60 and 62. In a representative system, three possible pressure levels as sensed in conduit 48 are possible, namely low, medium and high. Switch 60 is a pressure-responsive switch actuable at about 50 p.s.i. Switch 62 is a relatively high pressure switch actuable at about 80 p.s.i. When no toolholder 30 is in the spindle, the pressure in conduit 48 will be relatively low and of the order of 10 p.s.i. The outputs from switches 44, 60 and 62 are shown as inputs to a logic system suitable for control of the overall function of the machine tool.

FIG. 2 is a diagrammatic end view of spindle 12, showing the operator 44a of a switch 44 mounted on the machine frame. Operator 44a is engageable with and operable by cam 42 fixed to spindle 12 and aligned with slot 40 therein. The axis sense of that slot is thus defined in the plus X axis sense.

DESCRIPTION OF OPERATION

A tool 66 of the single-point type is preloaded in toolholder 30 in alignment with one of two coplanar lobes 38, 38a. In the present instance, the point of tool 66 is aligned with lower lobe 38a. Lobes 38 and 38a are 180° apart and coplanar as are the slots 40 and 40a in spindle 12 into which the lobes fit. It will be seen from the drawing that cam 42 in its actuation of switch 44 determines the axis sense X plus, of spindle slot 40. My pneumatic tool-sensing system will allow the toolholder to be installed in either possible position in spindle 12 and still detect the uniqueness between the lobes and slots.

When tool holder 30 is located into tapered bore 28 of spindle 12, one of three pressure conditions may exist. If groove portion 54 of toolholder 30 is in proper alignment with aperture 58, flow of air will occur from source 46 through needle valve 49, conduit 48, passage 50, passage 53, chamber 56, and out aperture 58. The fluidics system is properly sized to provide distinct pressure signals responsive to the quantity of airflow occurring in conduit 48. The three pressure levels previously described, together with the actuation of medium-pressure switch 60 and high-pressure switch 62, operate to provide output signals representative of these three conditions.

If pressure in conduit 48 is at a high level, both of switches 60 and 62 will be actuated. This indicates that toolholder groove portion 54 is not in alignment with aperture 58. If the pint of tool 66 is aligned with the groove portion 54, and cam 42 has been rotated to actuate limit switch 44, then the tool 66 as described will be in the minus X sense.

If only the medium-pressure switch 60 is actuated, the output signal occurring indicates that toolholder groove portion 54 is properly aligned with spindle aperture 58.

If the pressure in conduit 48 does not exceed about 10 p.s.i., then neither switch 60 nor 62 will be actuated. This absence of output signal indicates that toolholder 30 is either not in or incompletely seated in spindle 12.

It will thus be seen that I have provided by my invention a novel pneumatic tool-sensing system for machine tools.

I claim:

1. A pneumatic toolholder-sensing system for a machine toolhead including a spindle rotatably mounted in a quill and a toolholder for mounting in engagement with a bore in said spindle in a predetermined radially aligned position, wherein the improvement comprises a pressure source, a passageway connected between said source and said bore, an aperture through said spindle proximate its engagement with said holder, said aperture communicating to a lower pressure level, a peripheral groove portion in said holder alignable between said bore and said aperture, and a pressure-responsive means operatively connected to said passageway for providing an output signal responsive to pressure increase of a magnitude indicating the alignment of said groove portion with said aperture and, accordingly, of said toolholder with said spindle.

2. The combination as set forth in claim 1 wherein a single-point tool is fixed in said holder and wherein a switching means is operatively connected between said head and said spindle for providing a single output defining its point orientation relative to the axis of said head.

3. The combination as set forth in claim 1 in which said pressure-responsive means comprises a pair of pressure-responsive switches, both operatively connected to said passageway, the first of said switches operable responsive to medium pressure level in said passage, the second of said switches operable responsive to relatively high pressure level in said passageway wherein an output from both said switches indicates the misalignment of said toolholder and said spindle, wherein an output from said first switch indicates alignment of said toolholder and said spindle, and wherein an output from neither of aid switches indicates absence of said holder from said spindle.

4. The combination as set forth in claim 3 wherein said passageway includes a conduit coupled between said source and said quill, said conduit external thereto, said aperture communicating between said bore and ambient pressure.

5. The combination as set forth in claim 2 wherein said toolholder includes a pair of radial lobes spaced substantially 180° one from the other and wherein said spindle includes a pair of like-spaced slots for containing said lobes and a cam portion mounted in alignment with one of said slots for operating said switching means.

6. In a machine toolhead including a quill, a spindle mounted thereon for rotation, said spindle having a longitudinal bore therein, and a toolholder pressure fitted to a surface of said bore in said spindle, a pneumatic sensing system for checking for the presence of said toolholder in said spindle and for its alignment to a predetermined radial relationship with respect to said bore, said system comprising a constant pressure source coupled to said bore, an aperture communicating between a point on said surface and ambient pressure, a groove portion formed in the periphery of said holder alignable between said bore and said aperture in said predetermined relationship, and pressure-responsive means operatively connected to the output of said source for providing an output signal representative of pressure change, indicating alignment in said relationship.

7. The combination as set forth in claim 6 wherein a tool having a single point is mounted in said toolholder and wherein an additional means is operatively connected between said machine toolhead and said spindle for predetermining the orientation of said point and said holder relative to a defined axis of said machine toolhead.

8. The combination as set forth in claim 7 wherein said spindle includes a pair of radial slots, said toolholder including a pair of radial lobes engageable in said slots and wherein said additional means includes a cam fixed to said spindle in radial alignment with said slot, and a switch operable by said cam, said switch operator mounted on said machine toolhead along said axis.

9. In a machine tool having a support member and a spindle rotatably mounted thereon, a holder adapted to hold a member for machining operations, said spindle having a bore for engaging said holder and said member in predetermined radial position relative to said spindle, a pneumatic sensing system for sensing for the presence of said holder in said bore and for its registration in said radial position therein comprising, a pressure source, a conduit connected between said source and said bore, an aperture formed in said spindle between a point in its surface engaging said holder and ambient pressure, a groove portion formed in the periphery of said holder alignable between said bore and said aperture in said predetermined radial position, and a pressure-responsive means operatively connected to said conduit for providing an output signal responsive to pressure rise of a magnitude indicative of alignment of said groove portion with said aperture.

10. The combination as set forth in claim 9 in which said pressure-responsive means comprises a pair of pressure-responsive switches, the first of said switches operable responsive to rise to medium pressure level in said conduit, the second of said switches operable responsive to rise to high pressure level in said conduit, wherein coincidence of output from said switches indicates misalignment of said holder and said spindle, wherein an output from said first switch indicates alignment of said holder and said spindle, and wherein failure of output from both said switches indicates absence of said holder form said spindle.

11. In a machine toolhead including a quill, a spindle mounted therein for rotation, said spindle having a tapered bore for receiving a toolholder therein, a pneumatic sensing system for checking for the presence of said tool holder in said bore and for its alignment to a predetermined radial relationship therewith, said system comprising a relatively low pressure constant pressure source, a conduit coupled between the output of said source and said quill, a passageway connected to said conduit and extending through said quill and said spindle to the closed end of said bore, a groove portion of said toolholder substantially axial with the body of said holder, an aperture in said spindle alignable with said groove portion in said predetermined radial relationship, said aperture extending through said spindle to atmosphere, and a pair of pressure responsive electrical switches operatively connected to said conduit and operable to provide an output signal responsive to pressure rise to a first or a second level of magnitude.

12. The combination as set forth in claim 11 wherein said pair of switches are operable responsive to pressures of intermediate and high levels, respectively and wherein operation of said first switch indicates presence and alignment in said predetermined radial relationship of said holder and wherein operation of said second switch indicates mounting of said holder in said spindle but outside said predetermined radial relationship.

13. The combination as set forth in claim 11 in which said toolholder further includes a pair of radial lobes registerable with a corresponding pair of radial slots formed in said spindle.

14. In a machine toolhead including a quill, spindle mounted therein for rotation, said spindle having a tapered longitudinal bore for receiving a toolholder therein, a pneumatic sensing system for checking for the presence of said toolholder in said bore and for its alignment to a predetermined radial position therewith, said system comprising a constant pressure source, a conduit coupled between the output of said source and said quill, a passageway extending through said quill and said spindle to the closed end of said bore, a groove portion of said toolholder substantially axial with the body of said holder, an aperture in said spindle alignable with said groove portion in said predetermined position, said aperture extending through said spindle to atmosphere, and switching means operatively connected to said conduit responsive to change of pressure for providing an output signal representative of said alignment.